(12) United States Patent
Richter et al.

(10) Patent No.: US 6,252,375 B1
(45) Date of Patent: Jun. 26, 2001

(54) POWER MANAGEMENT SYSTEM AND CURRENT AUGMENTATION AND BATTERY CHARGER METHOD AND APPARATUS FOR A COMPUTER PERIPHERAL

(75) Inventors: Ronald J. Richter, Boise; Scott A. DeHart, Eagle, both of ID (US)

(73) Assignee: In-System Design, Inc., Boise, ID (US)

( * ) Notice: Subject to any disclaimer, the term of this patent is extended or adjusted under 35 U.S.C. 154(b) by 0 days.

(21) Appl. No.: 09/626,368

(22) Filed: Jul. 25, 2000

(51) Int. Cl.[7] .......................... H01M 10/44; H01M 10/46
(52) U.S. Cl. ............................ 320/127; 320/135
(58) Field of Search .................... 320/127, 124, 320/135, 137, 157, 160, 163

(56) References Cited

U.S. PATENT DOCUMENTS 5,914,844 * 6/1999 Lutley et al. .

* cited by examiner

*Primary Examiner*—Edward H. Tso
(74) *Attorney, Agent, or Firm*—Marger Johnson & McCollom, P.C.

(57) ABSTRACT

The current augmentation method is for use with a computer powered peripheral subsystem including a dynamic load, the dynamic load requiring greater power, from time to time, than the specified power available from the computer and specified interconnect bus or interface. This method includes use of a power node supplying power as necessary from the battery to the dynamic load, such that the varying dynamic load does not exceed the specified power available from the computer and interconnect bus. The method includes monitoring the load current, and injecting current into the power node to augment the current drive capability of the computer and peripheral bus. Preferably, the injecting is performed selectively based upon the result of the monitoring, e.g. only when the sensed load current is approaching a defined threshold level. Further, battery charging is performed only when it is determined that no current is being drawn through the battery to avoid distorting the voltage reading. The invented apparatus is also for selectively charging the battery from the current on the bus during relatively idle periods of peripheral dynamic load. The apparatus includes means for determining the chargeability of the battery in accordance with predefined chargeability criteria, and a battery charging circuit responsive to the determining means for selectively charging the battery only during times when the peripheral load current is limited and there is sufficient current available on the bus from the computer to recharge the battery.

15 Claims, 4 Drawing Sheets

POWER MANAGEMENT SYSTEM AND CURRENT AUGMENTATION AND BATTERY CHARGER METHOD AND APPARATUS FOR A COMPUTER PERIPHERAL

The present invention relates to battery-powered computer peripheral systems, and more particularly to a current augmentation and power management method and apparatus therefor.

BACKGROUND OF THE INVENTION

Many computer peripherals such as CDROM and disc drives are connected in operation with a lightweight, portable computer such as a laptop. Such peripherals are battery powered and their batteries require periodic battery charging to sustain high performance. Such peripherals are typically compact and are not equipped with separate AC power converters or other charging platforms. Thus, techniques for delivering power to the peripherals for their sustained operation have included dedicated power signal lines within the interface cable that also performs the logic and communication functions. One such technique is described in the *Universal Serial Bus Specification, Revision 1.0,* available from In-System Design of Boise, Id., assignee of the present invention.

With increased capacity and higher speed peripherals such as disc drives, higher power is consumed. This is especially true for disc drives during start up (so-called spin up) of the spindle drive motor after a period of dormancy. There is also higher power consumption during the taxing seek cycles between adjacent tracks when the disc's read/write head's voice coil is repeatedly, rapidly started and stopped. The result of sustained operation of higher power peripherals connected to computers have demanded more power than could be provided by the computer through the interface while remaining within the bus specified power.

SUMMARY OF THE INVENTION

The current augmentation method is for use with a battery-powered or conventional AC powered computer subsystem including a dynamic load powered by a power node connected with a battery having a characteristic drive capability. The method includes monitoring the dynamic load on the computer bus by one or more of load voltage sensing and load current sensing means, and injecting current into the power node to augment the current available from the computer interface to the dynamic loads generated by the peripheral. Preferably, the injecting is performed selectively based upon the result of the monitoring, e.g. only when the sensed load current is greater than a defined threshold level. The method preferably further comprises charging the battery wherein the charging is performed only when it is determined that no current is being drawn through the battery to avoid distorting the voltage reading.

The apparatus is for selectively charging a battery from a voltage source on a bus during periods of relative idle of a bus-connected battery-powered load. The apparatus includes means for determining the chargeability of the battery in accordance with predefined chargeability criteria, and a battery charging circuit responsive to the determining means for selectively charging the battery only during times of relative peripheral inactivity. Preferably, the determining means includes a surplus current detector operative to detect when the bus-powered load is drawing sufficiently less than a defined current to permit battery charging. Preferably, the battery charge circuit charges the battery by injecting a pulsed charge current into the battery, the pulsed charge current defining an on time when current is injected and an off time when current is not injected. Preferably, the determining means includes a battery voltage detector operative to measure the voltage level of the battery when the pulsed charge current is off.

DETAILED DESCRIPTION OF THE PREFERRED EMBODIMENT

Figure 1:
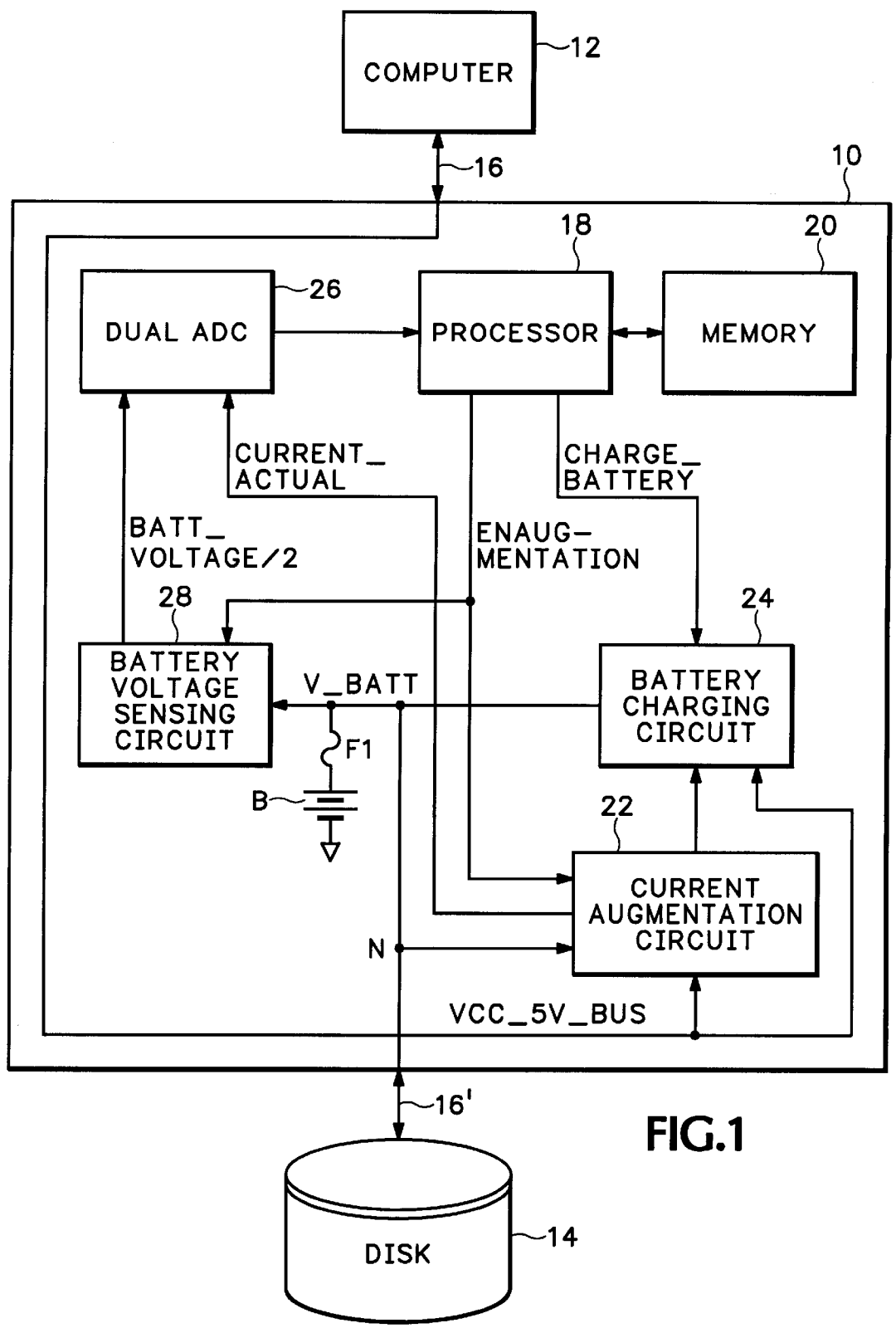
FIG. 1 is a system block diagram of a computer and peripheral, and the interface cable extending therebetween including the power management system in accordance with the invention.

FIG. 1 is a system block diagram showing the invented apparatus 10 in conjunction with a computer 12, a peripheral such as a disc or CDROM drive 14, and an interface cable 16 connected therebetween. Computer 12 and disc drive 14 will be understood to be conventional and, importantly, invented apparatus 10 requires no modifications thereto. Interface cable 16 is in general accord with the referenced *Universal Serial Bus* (USB) *Specification, Revision 1.0*. Preferably, apparatus 10 is highly integrated circuitry assembled within the housing of interface cable 16.

Apparatus 10 includes six series-connected 1.5V rechargeable alkaline batteries (represented as one at B and referred to herein simply as battery). Apparatus also includes a 2A fuse F1 connected in series with battery B. Apparatus further includes a processor 18, which may be any suitably programmed microprocessor or other suitable digital processor. Apparatus 10 also includes a memory 20 coupled with processor 18 for storing data and instructions suitably loaded therein for execution by processor 18 in accordance with the teachings of the present invention.

Apparatus 10 further includes a current augmentation circuit 22 to be described below by reference to FIG. 2. Apparatus 10 also includes a battery charging circuit 24 to be described below by reference to FIG. 4. Apparatus 10 further includes a dual analog-to-digital converter (ADC) 26 for sampling, digitizing and conveying voltage- and current-representative signals to processor 18. Apparatus 10 also includes a battery voltage sensing circuit 28 to be described below by reference to FIG. 3. Finally, apparatus 10 includes a current injection node N wherein current is injected into battery B to augment the power drive capability of peripheral 14 via a power-augmented interface cable 16'.

Figure 2:
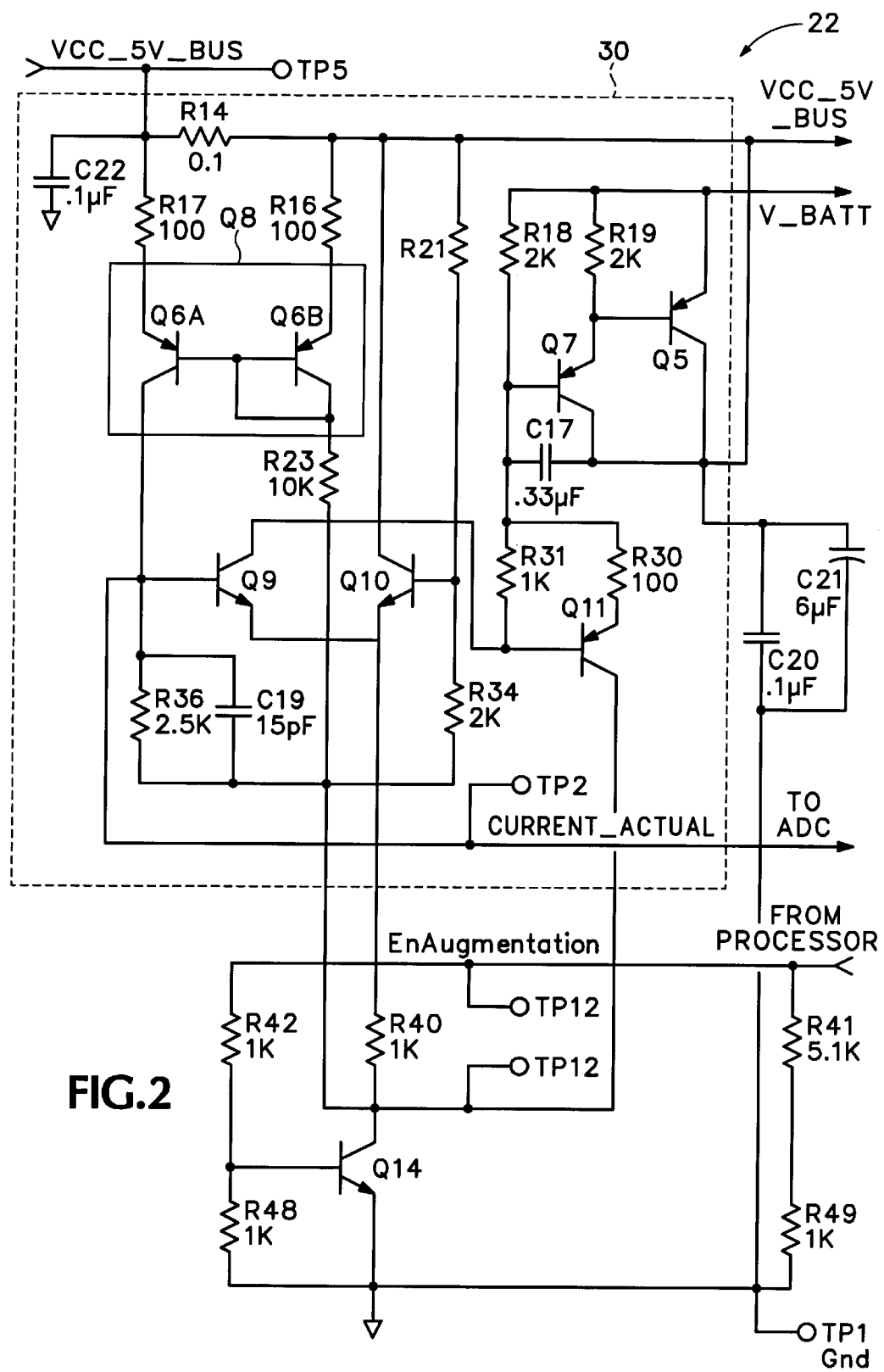
FIG. 2 is a detailed schematic diagram of a current augmentation circuit that forms a part of the apparatus in accordance with a preferred embodiment of the invention.

FIG. 2 is a detailed schematic diagram of the current augmentation circuitry 22 that forms a part of apparatus 10. Circuitry 22 is activated by an enable signal designated EnAugmentation. When EnAugmentation is active (e.g. a logic '1' or +5 volts), a transistor Q14 is turned on hard and saturates, thereby activating a current sensing and control circuit indicated generally within dashed outline 30. It is noted that preferably the components within the dashed outline that form a part of current sensing and control circuit 30 are spaced closely together, e.g. within a tightly laid out circuit board region of apparatus 10. Those of skill in the art will appreciate that the enable signal EnAugmentation is controlled by processor 18 suitably programmed. EnAugmentation is activated any time it is desired to augment the current drive of peripheral 14.

Referring now to current sensing and control circuit 30, it will be understood that preferably 0.1Ω sense resistor R14 will have zero volts (0V) across it so long as there is no current drawn from the VCC_5V_BUS. Two transistors indicated generally as Q8 form what is known as a current mirror. With no voltage drop across resistor R14, a current determined by the preferably 10 kΩ value of a resistor R23 flows through the collector of transistor Q8B. The same magnitude of current flows through the collector of Q8A, resulting in a voltage across a preferably 2.5 kΩ resistor R36 that is one-fourth (¼) across resistor R23. As current is required by the circuitry, it is drawn through resistor R14. The drop in voltage across resistor R14 causes the current in the collector of Q8A to increase linearly. The magnitude of this current is directly proportional to the current required (i.e. drawn) by peripheral 14.

An increase in current flow through resistor R36 causes the voltage thereacross to increase. When the voltage across resistor R36 approaches the voltage across a preferably 2 kΩ resistor R34, a transistor Q9 begins to conduct current. The current through the collector of Q9 is multiplied by a factor of ten by an amplifier in the form of a transistor Q11. This amplified current is applied to the base of a transistor Q7, producing an emitter current in transistor Q7 of $h_{fe}*I_b$ (where $h_{fe}$ is the transistor's gain and $I_b$ is the current through its base), as is known to those skilled in the art. This gain-amplified emitter current $h_{fe}*I_b$ is applied to the base of a transistor Q5 and is amplified through transistor Q5 in accordance with the same well-known formula $h_{fe}*I_b$. Transistor Q5 now conducts current from battery B to the 5V internal bus VCC_5V_BUS. Those of skill in the art will appreciate that the series of transistor amplifiers produces a very high current gain.

As the current in Q5 increases, it replaces current that was supplied by the VCC_5V_BUS (which drives the USB Bus), thereby causing the voltage across resistor R14 to drop. This drop in voltage across resistor R14 reduces the current through the collector of transistor Q8A, in turn reducing the current through the collector of transistor Q9. Those of skill will appreciate that the voltage at the base of a transistor Q10 is dependent upon the current through R14. At a predefined voltage level, transistor Q10 begins conducting and thus drawing current from the node connected with resistor 14. This negative feedback effectively limits the current through resistor R14 to a maximum current set by the combination of preferably 3 kΩ resistor R21 and preferably 2 kΩ resistor R34.

A signal designated CURRENT_ACTUAL is fed to an analog-to-digital converter lead on processor 18. Processor 18 measures the current drawn from the bus based upon the measured voltage at this input. Processor 18 thus acts as a surplus current detector capable detecting when the battery-powered load, e.g. peripheral 14, is drawing sufficiently less than a defined current to permit battery charging. Effectively, the current demand on the USB Bus is used by the processor 18 to determine when the processor can enable the charge process without overloading the USB Bus.

Those of skill in the art will appreciate that there are shown in FIG. 2 various other biasing, decoupling and test-point components. Such bias resistors include resistors R16 (100Ω), R17(100Ω), R18 (2 kΩ), R19 (2kΩ), R30 (100Ω), R31 (1 kΩ), R40 (1 kΩ ), R41 (5.1 kΩ), R42 (1 kΩ), R48 (1 kΩ) and R49 (1 kΩ). Such decoupling capacitors include capacitors C17 (0.33 μF), C19 (15 pF), C20 (0.1 μF), C21 (6 μF) and C22 (0.1 μF). Such test points include test points TP1, TP2, TP5 and TP12. Alternative and/or additional components of any suitable value are contemplated and all are within the spirit and scope of the invention.

Figure 3:
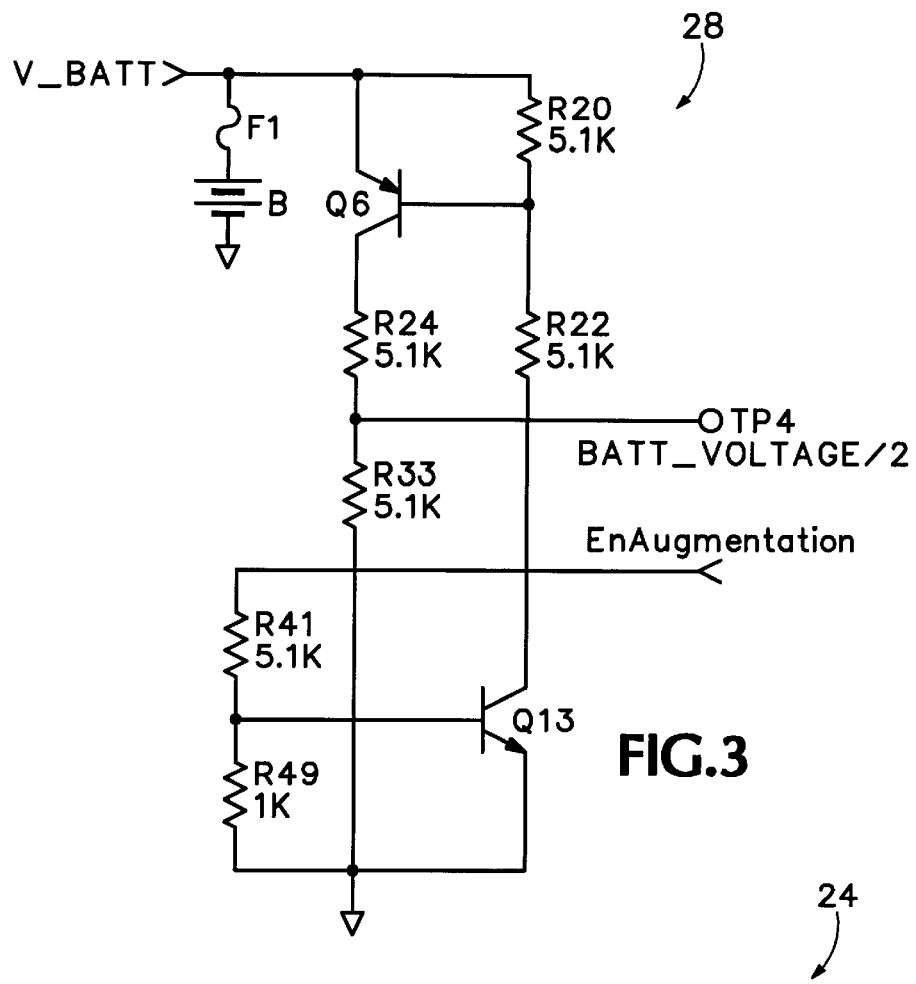
FIG. 3 is a detailed schematic diagram of a battery voltage circuit that forms a part of the apparatus in accordance with a preferred embodiment of the invention.

FIG. 3 illustrates a battery voltage sensing circuit 28 that forms part of apparatus 10. Those of skill in the art will appreciate that because battery B is electrically connected to the load, e.g. peripheral 14, battery voltage sensing circuit 28 effectively measures what will be referred to herein as load voltage. Battery voltage sensing circuit 28 is activated by processor 18 via the enable signal EnAugmentation. A transistor Q13 begins conducting when EnAugmentation is (high) active, thus biasing on the base of a second transistor Q6 via a voltage divider pair of preferably 5.1 kΩ resistors R20, R22 between V_BATT and ground. While transistor Q6 is conducting, half the value of V_BATT drives a signal designated BATT_VOLTAGE/2 by virtue of a second voltage divider pair of preferably 5.1 kΩ resistors R24, R33 between V_BATT and ground. BATT_VOLTAGE/2 is inputted to one of the two analog-to-digital converters in Dual ADC 26 coupled with processor 18.

Those of skill will appreciate that BATT_VOLTAGE/2 actually is only an approximation of V_BATT/2, since BATT_VOLTAGE/2=(V_BATT−$V_{ce(Q6)}$)*R33/(R33+R24). By setting R33 and R24 equal, and by turning transistor Q6 on hard, the approximation is very close to ideal.

Figure 4:
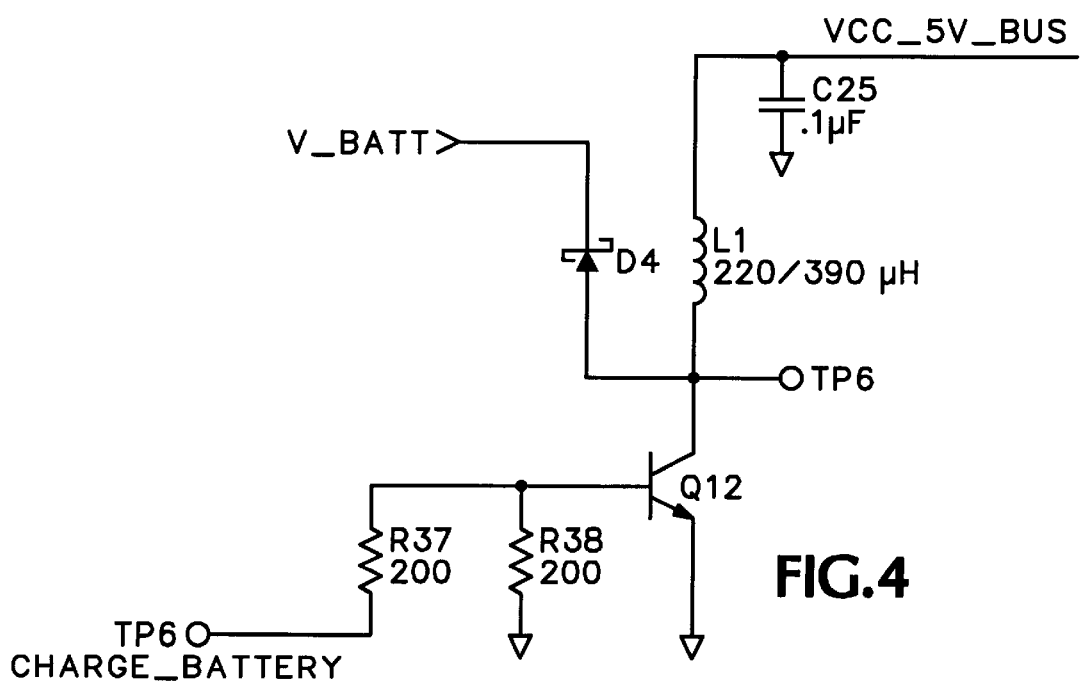
FIG. 4 is a detailed schematic diagram of a current augmentation circuit that forms a part of the apparatus in accordance with a preferred embodiment of the invention.

FIG. 4 illustrates a battery charging circuit 24 that forms a part of apparatus 10. Battery charging circuit 24 includes an enable signal designated CHARGE_BATT, which is driven by the processor when it is determined that battery charging should be started. Those of skill in the art will appreciate that, in accordance with the invention, battery charging begins only when no current is being drawn through the batteries at the time the voltage across the batteries is being measured. This avoids distortion of battery voltage data that is normally produced by the batteries' internal resistance.

When CHARGE_BATT is pulsed (high) active, a transistor Q12 is turned on, drawing current through an inductor L1. Those of skill in the art will appreciate that, in accordance with the well-known formula V=L*dI/dt, the instantaneous current through inductor L1 is governed by the formula dI=V*dt/L1. When the current has built up to a predetermined threshold level—a threshold level that may be programmed into memory 20 by processor 18—the CHARGE_BATT signal is pulled (low) inactive, turning transistor Q12 off. This causes the energy in the form of current that is stored in inductor LI to be discharged through a Schottky diode D4 into the battery. Resistors R37 (200Ω), R38 (200Ω), capacitor C25 (0.1 μF) and test-point TP6 also are shown in FIG. 4.

Current continues to flow through diode D4 until the current stored in the inductor diminishes to zero. Those of skill in the art will appreciate that the rate of current decay is governed also by the formulae given immediately above. Finally, those of skill in the art will appreciate that the inductance value of inductor L1 and the pulse timing of CHARGE_BATT are determined by the above formulae.

Battery charging circuit 24 remains in an idle state until the next charge pulse on CHARGE_BATT. The processor controls the on and off timing of CHARGE_BATT to optimize the charging cycle depending on the present battery voltage and the current drawn from the USB Bus. Preferably, the charging process is stopped altogether every millisecond (ms) and new load voltage and load current measurements are taken via the ADCs.

Figure 5:
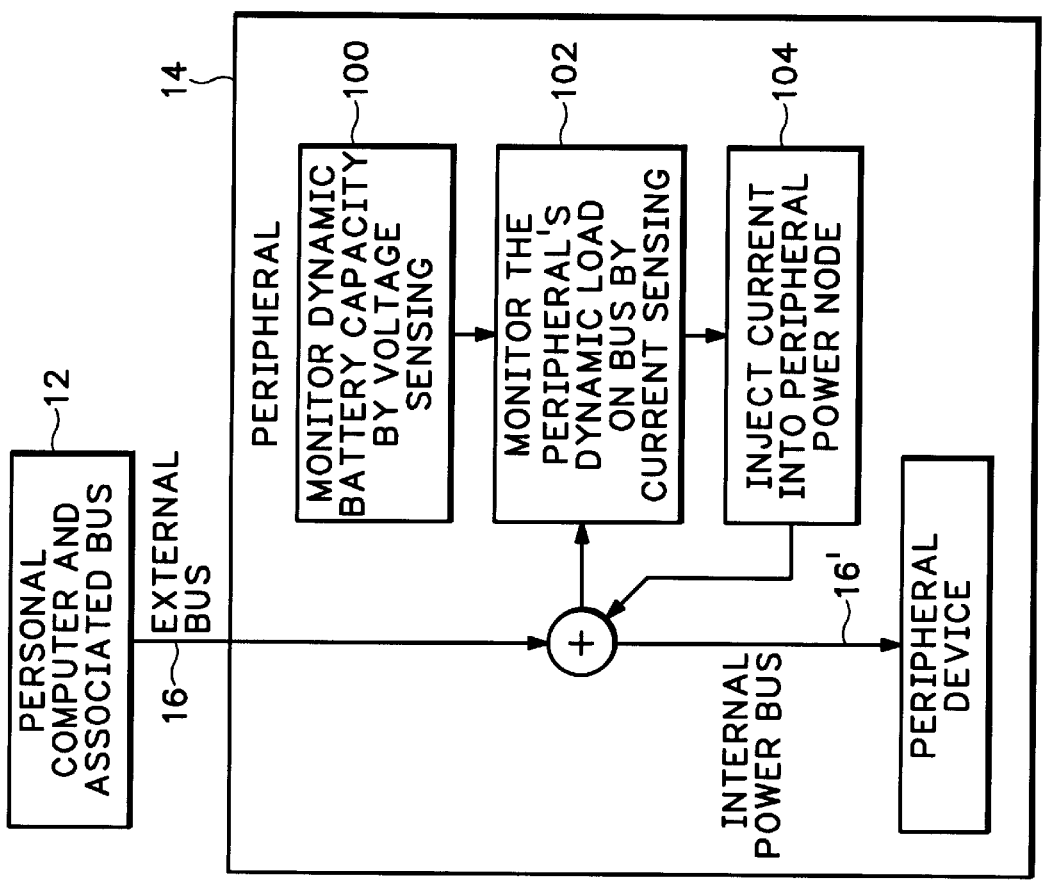
FIG. 5 is a flowchart illustrating the power management method in accordance with the invention.

FIG. 5 is a flowchart of the current augmentation method in accordance with the preferred embodiment of the invention described above, also showing schematically computer 12, peripheral 14, external bus or interface 16, internal power bus 16' and a current summing node ⊕. The method lends itself for use with a battery-powered subsystem including a dynamic load, e.g. a disk or CDROM motor, wherein the load is powered by a power node connected with a battery having a characteristic drive capability. The method preferably includes at 100 monitoring the dynamic load on the battery by load voltage sensing, e.g. via battery voltage sensing circuit 28. The method also preferably includes at 102 monitoring the current drawn from the computer bus, e.g., the USB, by current sensing. Those of skill will appreciate that a peripheral, e.g., a disk drive, may draw up to 1.2-amps (1.2 A) of current during spin-up. The USB specification limits current drive, however, to 500 mA. Thus, current injection augments the peripheral drive capability to the USB. The method further includes at 104 injecting current into the power node to augment the current drive capability of the battery, e.g. via current augmentation circuit 22 and battery charging circuit 24.

In accordance with a preferred embodiment of the invention, the current-injecting is performed selectively, based upon the result of the monitoring, as described above in terms of pulse charging only under predefined current draw and voltage level criteria. The current-injecting is performed only when the sensed battery voltage is less than a defined threshold voltage, as described above. The current-injecting is performed also only when the sensed load current is less than a defined threshold current, also as described above. Finally, battery charging is performed only when it is determined that no current is being drawn through the battery, also as described above.

Those of skill in the art will appreciate that one or more such criteria as are enumerated above may be used to determine when current injection is to be performed. Thus, it is within the spirit and scope of the invention to use the criteria in any suitable combination.

Figure 6:
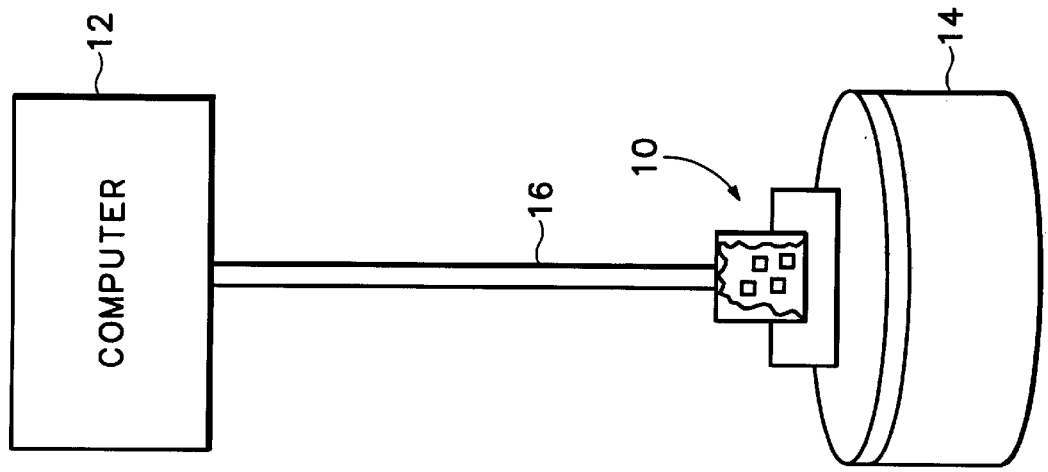
FIG. 6 is a plan view of an interface cable housing the power management system in accordance with a preferred embodiment of the invention.

Referring briefly to FIG. 6, the preferred physical configuration of the invention is illustrated in a plan view. Interface cable 16 extending between computer 12 and peripheral 14 may be seen integrally to house apparatus 10 within a controller that forms a part of peripheral 14. Those of skill in the art will appreciate that large-scale integrated (LSI) circuitry and hybrid analogue-and-digital packaging greatly reduce the layout requirements for apparatus 10 and alternatively may enable the circuitry to be miniaturized for containment within, for example, a connector head or housing preferably at the peripheral end of a modified cable 16'. Of course, other alternative physical configurations are contemplated, and are within the spirit and scope of the invention.

Notably, the invented method makes no attempt to hold up voltage; it is a current source designed to supply current. Preferably, the charge rate slows down over a period of hours as the voltage across battery B reaches full charge (which is preferably 1.5V, rather than the nominal 1.65V specified by the manufacturer as representing a topped-off battery). Also, preferably, the charge rate is relatively low, e.g. less than approximately 50 mA average charge current. This prolongs battery life by eliminating the heat-related stress during the charge cycle. Those of skill will appreciate that rechargeable alkaline batteries are preferred over either nickel-metal hydride or nickel cadmium because the latter self-discharge over times of relative non-use, e.g. they have a relatively short shelf life.

With rechargeable alkaline batteries configured for charging in accordance with the present invention, surprisingly high capacity and long life is realized. Consider a disk drive that transfers approximately 500 kilobytes/second (KBps) through the USB port, which translates to approximately 1.8 gigabytes/hour (GBph). Few users would transfer that much data on a portable computer. Nevertheless, such a high rate of use of a portable computer and attached peripheral every business day of the year (260 days/year) would leave the disk drive operational for more than four years. Accordingly, such extremely high demands as may be placed on the USB nevertheless are fully accommodated by use of the present invention.

Having illustrated and described the principles of this invention in a preferred embodiment thereof, it should be readily apparent to those skilled in the art that the invention can be modified in arrangement and detail without departing from such principles. We claim all modifications coming within the scope of the accompanying claims.

What is claimed is:

1. For use with a battery-powered computer interface including a dynamic load powered by a power node connected with a battery having a characteristic drive capability, a current augmentation method comprising:
   monitoring the dynamic load on the computer interface by one or more of load voltage sensing and load current sensing, and
   injecting current into the power node to augment the current drive capability of the interface.

2. The method of claim 1 wherein said injecting is performed selectively based upon the result of said monitoring.

3. The method of claim 2 wherein said injecting is performed only when the sensed load voltage is less than a defined threshold level.

4. The method of claim 2 wherein said injecting is performed only when the sensed load current is less than a defined threshold level.

5. The method of claim 2, which further comprises charging the battery, wherein said charging is performed only when it is determined that substantially no current is being drawn through the battery.

6. Apparatus for selectively charging a battery from a voltage source on a bus during periods of relative idle of a bus-connected load, the apparatus comprising:
   means for determining the chargeability of the battery in accordance with predefined chargeability criteria, and
   a battery charging circuit responsive to said determining means for selectively charging the battery only during times of relative battery chargeability.

7. The apparatus of claim 6 wherein said determining means includes a surplus current detector operative to detect when the dynamic load is drawing sufficiently less than a defined current to permit battery charging.

8. The apparatus of claim 6 wherein said battery charge circuit charges the battery by injecting a pulsed charge current into the battery, the pulsed charge current defining an on time when current is injected and an off time when current is not injected, and wherein said determining means includes a battery voltage detector operative to measure the voltage level of the battery when said pulsed charge current is off.

9. The apparatus of claim 6 wherein said determining means includes a load voltage sensing mechanism operative to periodically sense the load voltage and wherein said determining means further includes a comparison means for comparing the sensed load voltage with predefined load voltage criteria.

10. The apparatus of claim 6 wherein said determining means includes a load current sensing mechanism operative to periodically sense the load current and wherein said determining means further includes comparison means for comparing the sensed load current with predefined load current criteria.

11. The apparatus of claim 6 wherein said determining means includes a load voltage sensing mechanism operative to periodically sense the load voltage and wherein said determining means further includes a comparison means for comparing the sensed load voltage with predefined load voltage criteria and wherein said determining means further includes a load current sensing mechanism operative to periodically sense the load current and wherein said determining means further includes a comparison means for comparing the sensed load current with predefined load current criteria.

12. A power management system for a peripheral connected with a computer providing a voltage source on a bus, the system comprising:

a battery;

a processor;

a memory containing instructions executable by said processor;

a first analogue-to-digital converter (ADC) coupled with said processor for digitizing a battery voltage;

a battery voltage sensing circuit connected to said battery for sensing the voltage output by the battery and providing the sensed voltage to said ADC;

a battery charging circuit connected with the voltage source on the bus for selectively charging said battery responsive to a command from said processor; and a current augmentation circuit connected with said one or more ADCs and said battery charging circuit for injecting current into a power node of the computer peripheral responsive to a command from said processor.

13. The system of claim 12 which comprises a second ADC coupled with said processor for digitizing a peripheral load current, wherein both the battery voltage and the peripheral load current are digitized and wherein said processor monitors the same to selectively generate said commands to said battery charging circuit and said current augmentation circuit based at least in part upon both the battery voltage and the peripheral load current.

14. The system of claim 12 which is integrally housed within the peripheral.

15. The system of claim 12 which is integrally housed within an interface cable configured to extend between the computer and the peripheral.

* * * * *

UNITED STATES PATENT AND TRADEMARK OFFICE
CERTIFICATE OF CORRECTION

PATENT NO.    : 6,252,375 B1                               Page 1 of 1
DATED         : June 26, 2001
INVENTOR(S)   : Ronald J. Richter and Scott A. DeHart It is certified that error appears in the above-identified patent and that said Letters Patent is hereby corrected as shown below:

<u>Title page,</u>.
Delete "[22] Filed:   Jul. 25, 2000" and
Add -- [22] Filed:   Jul. 24, 2000 --

Signed and Sealed this

Twenty-sixth Day of March, 2002

Attest:

JAMES E. ROGAN
*Attesting Officer*          *Director of the United States Patent and Trademark Office*